(12) United States Patent
Rosenberg et al.

(10) Patent No.: US 11,488,236 B2
(45) Date of Patent: Nov. 1, 2022

(54) SYMBOL-ASSISTED MENU SELECTION FOR TRANSACTION TERMINALS

(71) Applicant: VenueNext, Inc., Santa Clara, CA (US)

(72) Inventors: Edan Rosenberg, Santa Clara, CA (US); Dustin Alpert, Santa Clara, CA (US); Frank Conway, Santa Clara, CA (US)

(73) Assignee: VenueNext, Inc., Santa Clara, CA (US)

( * ) Notice: Subject to any disclaimer, the term of this patent is extended or adjusted under 35 U.S.C. 154(b) by 229 days.

(21) Appl. No.: 16/798,169

(22) Filed: Feb. 21, 2020

(65) Prior Publication Data
US 2021/0264504 A1    Aug. 26, 2021

(51) Int. Cl.
| | |
|---|---|
| *G06Q 30/06* | (2012.01) |
| *G06T 11/60* | (2006.01) |
| *G06T 11/00* | (2006.01) |
| *G06F 40/109* | (2020.01) |
| *G06F 9/451* | (2018.01) |
| *G07G 1/00* | (2006.01) |
| *G06F 3/0482* | (2013.01) |

(52) U.S. Cl.
CPC ......... *G06Q 30/0641* (2013.01); *G06F 9/451* (2018.02); *G06F 40/109* (2020.01); *G06Q 30/0603* (2013.01); *G06Q 30/0633* (2013.01); *G06T 11/001* (2013.01); *G06T 11/60* (2013.01); *G07G 1/0009* (2013.01); *G06F 3/0482* (2013.01); *G06T 2200/24* (2013.01)

(58) Field of Classification Search
CPC .............. G06Q 30/0641; G06Q 20/20; G06Q 30/0603; G06Q 30/0633; G06Q 20/201; G07G 1/0009; G07G 1/01; G07G 1/0036; G06F 9/451; G06F 40/109; G06F 3/0482; G06T 11/001; G06T 11/60; G06T 2200/24
See application file for complete search history.

(56) References Cited

U.S. PATENT DOCUMENTS

| | | | |
|---|---|---|---|
| 9,406,084 B2 * | 8/2016 | Havas ................. | G06Q 20/405 |
| 10,332,193 B2 * | 6/2019 | Bahrami ............ | G06Q 30/0241 |
| 10,788,900 B1 * | 9/2020 | Brendel ................ | G06N 7/005 |
| 2004/0158499 A1 * | 8/2004 | Dev ....................... | G06Q 30/02 705/26.1 |
| 2005/0021407 A1 * | 1/2005 | Kargman ................ | G07G 1/12 705/15 |

(Continued)

*Primary Examiner* — Alvin H Tan
(74) *Attorney, Agent, or Firm* — Hickman Becker Bingham Ledesma LLP

(57) ABSTRACT

A method and system for generating perceivable data representing a digital order is provided. A GUI receives a user selection of a particular button of a plurality of buttons. Each button of the plurality of buttons is for adding a respective menu or catalog item to a checkout cart. The particular button displays within its border at least one line of copy and at least one emoji, where the at least one emoji indicates the respective menu or catalog item. The at least one line of copy provides a text description of the respective menu or catalog item and is displayed in at least a minimum font point size and at least a minimum color contrast ratio relative to a background of the particular button. The GUI is then updated to indicate that the respective menu or catalog item for the particular button is added to the checkout cart.

18 Claims, 8 Drawing Sheets

(56) References Cited

U.S. PATENT DOCUMENTS

| | | | | |
|---|---|---|---|---|
| 2009/0259553 A1* | 10/2009 | Carroll | ................ | G06Q 20/204 |
| | | | | 705/25 |
| 2014/0058902 A1* | 2/2014 | Taylor | .................... | G06Q 30/06 |
| | | | | 705/26.81 |
| 2018/0082234 A1* | 3/2018 | Burt | ................... | G06Q 30/0635 |
| 2019/0347712 A1* | 11/2019 | Fogelberg | .......... | G06Q 30/0633 |

\* cited by examiner

200

210
Receiving, via a GUI, a selection of a particular button of a plurality of concurrently displayed buttons, where each button of the plurality buttons adds a respective menu or catalog item to a checkout cart, where the particular button has a border and displays within the border at least one line of copy and at least one emoji, and where the at least one line of copy is displayed in a minimum font point size and characterized by at least a minimum contrast ratio relative to the background of the particular button.

260
Updating the display of the GUI to indicate that the respective menu or catalog item for the particular button is added to a checkout cart.

SYMBOL-ASSISTED MENU SELECTION FOR TRANSACTION TERMINALS

TECHNICAL FIELD OF THE DISCLOSURE

One technical field of the present disclosure is electronic transactions for goods and services. Another technical field is the creation and use of symbols representing orders for goods and services in practical applications such as transactions in food, beverage or other tangible goods.

BACKGROUND

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

Transactions for goods and services are increasingly digitized to increase efficiency, convenience, and uniformity in sales. Historically, point-of-sale (POS) menus and catalogs were text-based. Each purchasable item may be presented as a "button" comprising text descriptions of the purchasable items. Experienced POS users may not read the text descriptions of the purchasable items because they eventually develop muscle memory of the locations of each menu item. In the sports and entertainment industry, however, the individuals working POS systems for events are typically first-time volunteers. The muscle memory for these volunteers is not established until well into the event, making the efficiency of POS operations sub-optimal.

More recently, POS systems support images. Images can be displayed side-by-side with text descriptions of the item within a graphical user interface (GUI) button for a menu item. Images can also be used as backgrounds of the button with text descriptions overlaid onto the image. The use of images is meant to close "the muscle memory gap" by providing visual cues to new POS users. While the use of images may improve menu item recognition for new users, it introduces new technical problems. Having images be displayed side-by-side with text descriptions on a button requires that the button be significantly larger than its text-only counterpart. A significantly larger button reduces information density on a display screen compared to the text-only approach. Overlaying text descriptions onto an image, on the other hand, reduces readability which may violate American Disability Association (ADA) recommendations. Furthermore, it is challenging to disambiguate between photos of similar items. Quickly identifying the difference between an image of a hamburger and an image of a cheeseburger would still require a user to read the text descriptions on each menu button. The inclusion of images may also increase overhead while setting up POS systems as images have to be sourced and uploaded into POS systems.

BRIEF DESCRIPTION OF THE DRAWINGS

In the drawings:

FIG. 2 illustrates a digital order selection and a graphical user interface (GUI) of a point-of-sale (POS) computer system update process according to an embodiment.

FIG. 4 illustrates an example GUI of a POS computer system according to an embodiment.

DETAILED DESCRIPTION

Figure 1:
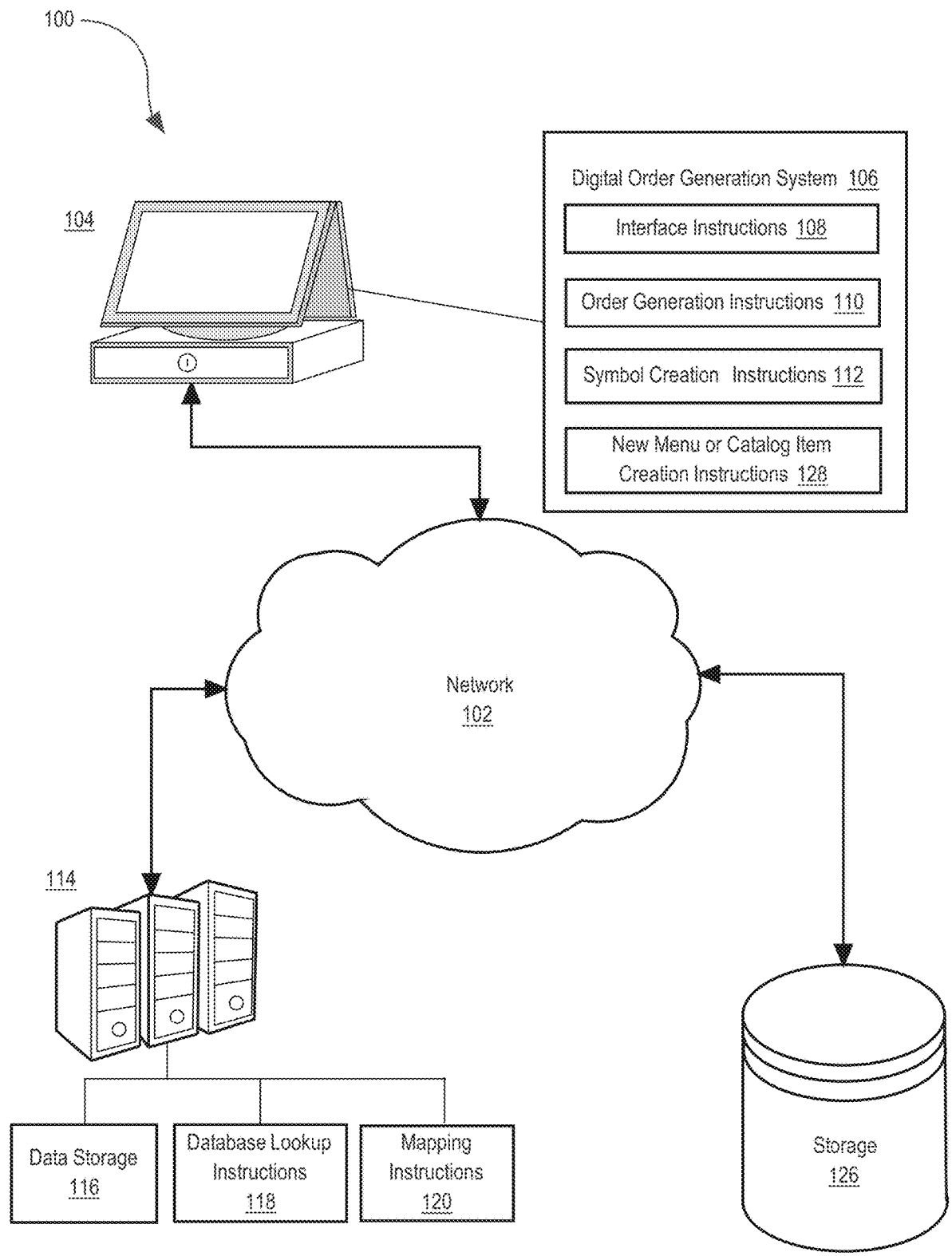
FIG. 1 illustrates an example networked computer system with which an embodiment may be practiced.

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

1. GENERAL OVERVIEW

There is a need for a system which provides the digital transaction capabilities of a POS system that can maintain or exceed the information density of existing POS systems in terms of number of concurrently displayed selectable menu buttons while providing quick fine-grained menu or catalog item recognition.

In some embodiments, a computer implemented method facilitates the selection of digital orders for menu or catalog items. A digital order may be specified at a graphical user interface (GUI) of a point-of-sale (POS) computer system based on user selection. The GUI may receive user selections based on selections of particular buttons of a plurality of concurrently displayed buttons at the GUI.

Each button of the plurality of concurrently displayed buttons may be generated, on a device comprising a screen, to be visually perceivable by using a combination of one or more of: symbols, such as emojis, text descriptions, specific minimum font sizes of text descriptions, and color contrast ratios of text descriptions relative to the background. An emoji may encompass a digital ideogram in the form of a glyph, icon, or symbol that conveys meaning through its visual resemblance to a physical object or concept. In some embodiments, an emoji may be defined according to digital data that conforms to a standard, such as Unicode hexadecimal values that correspond to standardized definitions of symbols. In other embodiments, the term "emoji" in this description may refer to any image, thumbnail, glyph, icon or symbol that graphically represents an item of food, an ingredient, or any other physical item of an order or transaction, and is not limited to specific standardized digital data. In some embodiments, emojis are inserted inline with text because each emoji corresponds to a Unicode Standard code point (a hexadecimal number).

A button of the plurality of concurrently displayed buttons may display within its border at least one line of copy, where the at least one line of copy may provide a text description of the respective menu or catalog item, and where the text description may be displayed in at least a minimum font point size and characterized by at least a minimum color contrast ratio relative to the background of the particular button.

A button of the plurality of concurrently displayed buttons may also display within its border at least one emoji, where the at least one emoji may indicate the respective menu or catalog item. A menu or catalog item may be represented by a combination of one or more emojis. A second emoji may indicate a modification to the respective menu or catalog item. A second emoji may also indicate an additional respective menu or catalog item.

After completing a digital order via selection of a particular button from a plurality of concurrently displayed buttons, the display of the GUI may be updated to indicate that the respective menu or catalog item for the particular button is added to a checkout cart. A checkout cart may encompass computer-stored state representing an order list or set of menu or catalog items currently selected by a user of the POS computer system for eventual purchase. For example, the computer-stored state may encompass data that identifies the menu or catalog items currently selected by respective item identifiers, product identifiers, bar code identifiers, etc. In some embodiments, a checkout cart is viewable and editable via an interactive portion of the graphical user interface of the POS computer system that allows a user to review selected menu or catalog items and make any necessary modifications or additions to the selected menu or catalog items (e.g., add an item to the checkout cart or remove an item from the checkout chart). In some embodiments, the viewable checkout cart portion of the GUI displays a calculated current total price of the current menu or catalog items currently selected for eventual purchase. The display of the current total price may automatically update in the GUI portion as items are added to and removed from the checkout cart.

A button for a new menu or catalog item may be added based on a text input that describes the specific new menu or catalog item. The computer-implemented method may be further utilized to suggest, using an automatic emoji suggestion system, a set of one or more emojis based on input of a text description of a new menu or catalog item. The text description of the new menu item may be transmitted to a server comprising a data storage. In some embodiments, the data storage comprises one or more databases containing emoji and menu or catalog item data. The one or more databases may contain data that maps menu or catalog items with a set of one or more emojis. The server may then automatically identify one or more emojis corresponding to the received new item or catalog item data.

In some embodiments, a user may manually select a set of one or more emojis from a plurality of presented emojis to be mapped with the new menu or catalog item. In some embodiments, the manually selected set of one or more emojis and the corresponding mapped new menu or catalog item data is sent to a server and used to train a machine learning model to automatically map the most relevant sets of one or more emojis to the corresponding menu or catalog items.

The technical problem of displaying selectable buttons for menu or catalog items on a limited display screen of a POS terminal while providing sufficient information density is solved, in some embodiments, through the combination of using minimum font sizes, minimum contrast ratios, and emojis. The use of both text and emojis provide better visual cuing while meeting ADA accessibility recommendations.

2. EXAMPLE COMPUTING ENVIRONMENTS AND COMPUTER COMPONENTS

FIG. 1 illustrates an example networked computer system with which some embodiments may be practiced. FIG. 1 is shown in simplified, schematic format for purposes of illustrating a clear example and some embodiments may include more, fewer, or different elements. System 100 comprises various entities and devices that may be used to practice an implementation. Network 102 is a network entity that facilitates communication between entities depicted in FIG. 1. Connection to network 102 is show by double-sided arrows between a connecting entity and network 102. Network 102 may be any electronic communication medium or hub that facilitates communications between two or more entities including, but not limited to, an internet, an intranet, a local area connection, a cloud-based connection, a wireless connection, a radio connection, a physical electronic bus, or any other medium over which digital and electronic information may be sent and received. The coupling of network 102 to any entity in system 100 may comprise any connection sufficient to facilitate data sharing or communication between the entities, including the means described above and possibly including a hard-wired connection, a wireless connection, a cloud-based connection, and/or a digital signal-based connection.

Network 102 is coupled to transaction generation device 104. Transaction generation device 104 may be any entity, including a device comprising hardware and software, that facilitates the generation of order data representing a digital order for menu or catalog items. In some embodiments, transaction generation device 104 is a point of sale terminal or device that is used to generate digital order data manually by a human operator or automatically based on some input. In some embodiments, such a point of sale terminal or device comprises one or more screens and input means to display and interact with information created and received by transaction generation device 104.

Transaction generation device 104 comprises digital order generation system 106. Digital order generation system 106 may be any hardware, software, entity, or device that facilitates generation of a digital order corresponding to a transaction for menu or catalog items. Digital order generation system 106 comprises interface instructions 108, order generation instructions 110, symbol creation instructions 112, and new menu or catalog item creation instructions 128. Interface instructions 108 may be any set of digital instructions, protocols, source code, and/or software that facilitates a digital interface on transaction generation device 104. In some embodiments, interface instructions 108 facilitate a user interface that enables on transaction generation device 104 to receive input from a human operator or display input to a human operator related to digital order data representing an order for menu or catalog items.

Order generation instructions 110 may be any set of digital instructions, protocols, source code, and/or software that facilitates generation of digital order data on transaction generation device 104. In some embodiments, order generation instructions 110 facilitate the creation of digital order data by transaction generation device that represents an order for menu or catalog items. Symbol creation instructions 112 may be any set of digital instructions, protocols, source code, and/or software that facilitates generation of a digital symbol to associate with order data generated on transaction generation device 104. In some embodiments, symbol creation instructions 112 facilitate the creation of one or more emojis for display on transaction generation device 104 where the one or more emojis is associated with one or more orders for menu or catalog items. New menu or catalog items creation instructions 128 may be any set of digital instructions, protocols, source code, and/or software that facilitates the generation of one or more new selectable digital orders representing menu or catalog items. In some embodiments, new menu or catalog items creation instructions facilitate the generation of one or more new selectable digital orders by receiving input via a new menu or catalog items creation interface. In some embodiments not pictured in FIG. 1, digital order generation system 106 or any parts thereof may be coupled directly to any other entity depicted in system 100 by a network or digital connection such as network 102.

Network 102 is coupled to server 114. Server 114 may be any combination of singular or groups of electronic servers. One or more servers may comprise hardware, software and/or connections which facilitate a server system for storing digital data such as digital order data and image data. In some embodiments, server 114 received orders generated by transaction generation device 104 for storage in an internal or external digital memory medium. Server 114 comprises data storage 116. Data storage 116 may be any hardware, software, or entity capable of storing digital data such as digital order data and image data as discussed herein. Server 114 comprises database lookup instructions 118. In some embodiments, database lookup instructions 118 facilitate the searching of a database for particular sets of image data based on input. For example, database lookup instructions 118 may facilitate the search for one or more emojis corresponding to a text input. Server 114 also comprises mapping instructions 120. In some embodiments, mapping instructions 120 facilitate a mapping between two or more sets of data stored and/or received by server 114. For example, digital data representing one or more emojis may be mapped to one or more digital orders for menu or catalog items. Mapping instructions 120 may facilitate a mapping, in a database, between one or more emojis and text input representing one or more digital orders for menu or catalog items.

Storage 126 may be any number of individual or linked storage devices or mediums that allow the storage of digital data related to the order data and transaction processes discussed herein. For example, storage 112 may store local data in a fashion similar to server 114. In some embodiments, storage 112 comprises digital software comprising digital order generation system 106 which is connected to transaction generation device 104. In various implementations, system 100 is designed to execute process 200 described below. In some embodiments not pictured in FIG. 1, additional devices such as additional POS terminals, vendor computers, data tracking systems, or financial databases may be coupled to network 102 and therefore the other entities of system 100.

3. EXAMPLE PROCESSES

FIG. 2 illustrates a digital order selection and a graphical user interface of a point-of-sale computer system update process according to an embodiment. To illustrate a clear example, FIG. 2 and certain other diagrams are discussed in the context of FIG. 1, but other embodiments could be performed using arrangements other than as shown in FIG. 1. FIG. 2, and each other process diagram or flow diagram herein is intended as a plan, algorithm, or specification for programming one or more computer programs or other software elements to implement the functions that are represented in the diagrams, and is expressed at the same level of detail as customarily used by persons having ordinary skill in the art to which this disclosure pertains to communicate among themselves about software architecture and program flow at development stages before actual coding is undertaken. Furthermore, all functional statements in the description of FIG. 2, FIG. 3, FIG. 4, FIG. 5, and FIG. 6 are intended to describe programmed, executable machine operations of one or more of the elements of FIG. 1, FIG. 7, FIG. 8, unless the context indicates otherwise; that is, the disclosure is directed to particular machines programmed to execute in a particular way to execute or implement the specified functions, and/or digital storage media recorded with executable instructions that can be loaded and executed in a machine to perform the specified functions, and their practical applications, and is not directed to ideas in the abstract, concepts or functions alone.

The example process of updating a graphical user interface of a point-of-sale computer system 200 depicted in FIG. 2 comprises receiving, via the GUI, a user selection (e.g., via a pointing device, keyboard, touch-sensitive surface or other user input device) of a particular button of a plurality of concurrently displayed buttons, each button of the plurality of concurrently displayed buttons for adding a respective menu or catalog item to a checkout cart, the particular button having a border and displaying within the border at least one line of copy and at least one emoji, the at least one line of copy providing a text description of the respective menu or catalog item and displayed in at least a minimum font point size and characterized by at least a minimum color contrast ratio relative to a background of the particular button, the at least one emoji indicating the respective menu or catalog item; and updating display of the GUI to indicate that the respective menu or catalog item for the particular button is added to the checkout cart.

Returning to FIG. 2, the process 200 begins at step 210 by receiving, via a GUI, a selection of a particular button of a plurality of concurrently displayed buttons, where each button of the plurality buttons adds a respective menu or catalog item to a checkout cart comprising an order list, and where the particular button having a border and displays within the border at least one line of copy and at least one first emoji. The plurality of buttons may be generated by a first device comprising a screen, such as a POS terminal or any other device capable of generating a digital order of respective menu or catalog items. For example, a POS terminal on which the plurality of concurrently displayed buttons is displayed may use a screen attached to the POS terminal to display the plurality of concurrently displayed buttons. In some embodiments, the selection of a particular button of the plurality of buttons adds a digital order of a respective menu or catalog item to a checkout cart.

In some embodiments, each button of the plurality of the concurrently displayed buttons comprises a border and at least one line of copy within the border, where the line of copy is a text description of the digital order associated with each button. Each button may be of a size of which is enough to display at least one line of text description where the text of the text description has a minimum font size in points. In some embodiments, each button is of a certain size which is enough to display no more than four lines of copy within the border, where the lines of copy are text descriptions of the digital order with each button. For example, a particular button of the plurality of buttons may be associated with a digital order of a cheeseburger with bacon. Within the border of the particular button, the text description "Bacon Cheeseburger" may be displayed, where the text description "Bacon Cheeseburger" may be no more than four lines, and where "Bacon Cheeseburger" may be displayed in at least a minimum font size such as, for example, 18-point. In some embodiments, the lower the minimum font size the higher the color contrast ratio between the text and the button background. For example, if minimum font size is below 18-point (e.g., 12-point), then the color contrast ratio may be 4.5:1. If the minimum font size is 18-point or greater, then the color contrast ratio may be 3:1.

In some embodiments, the at least one line of copy within the border of each concurrently displayed button meets a minimum color contrast ratio relative to the background of each button. The World Wide Web Consortium (W3C) recommends providing enough contrast between text and its background so that it can be read by people with moderately low vision. The contrast between text and its background may be defined using a contrast ratio value, which may be expressed as (L1+0.05):(L2+0.05), where L1 is the relative luminance of the lighter of the colors, and L2 is the relative luminance of the darker of the colors. Thus, the at least one line of copy within the border of each concurrently displayed button may meet a minimum color contrast ratio of 4.5:1 (for text less than 18-point font) or 3:1 (for text 18-point font or greater) relative to the background of each button, where the at least one line of copy may be a text description of the digital order associated with each button.

Figure 4:
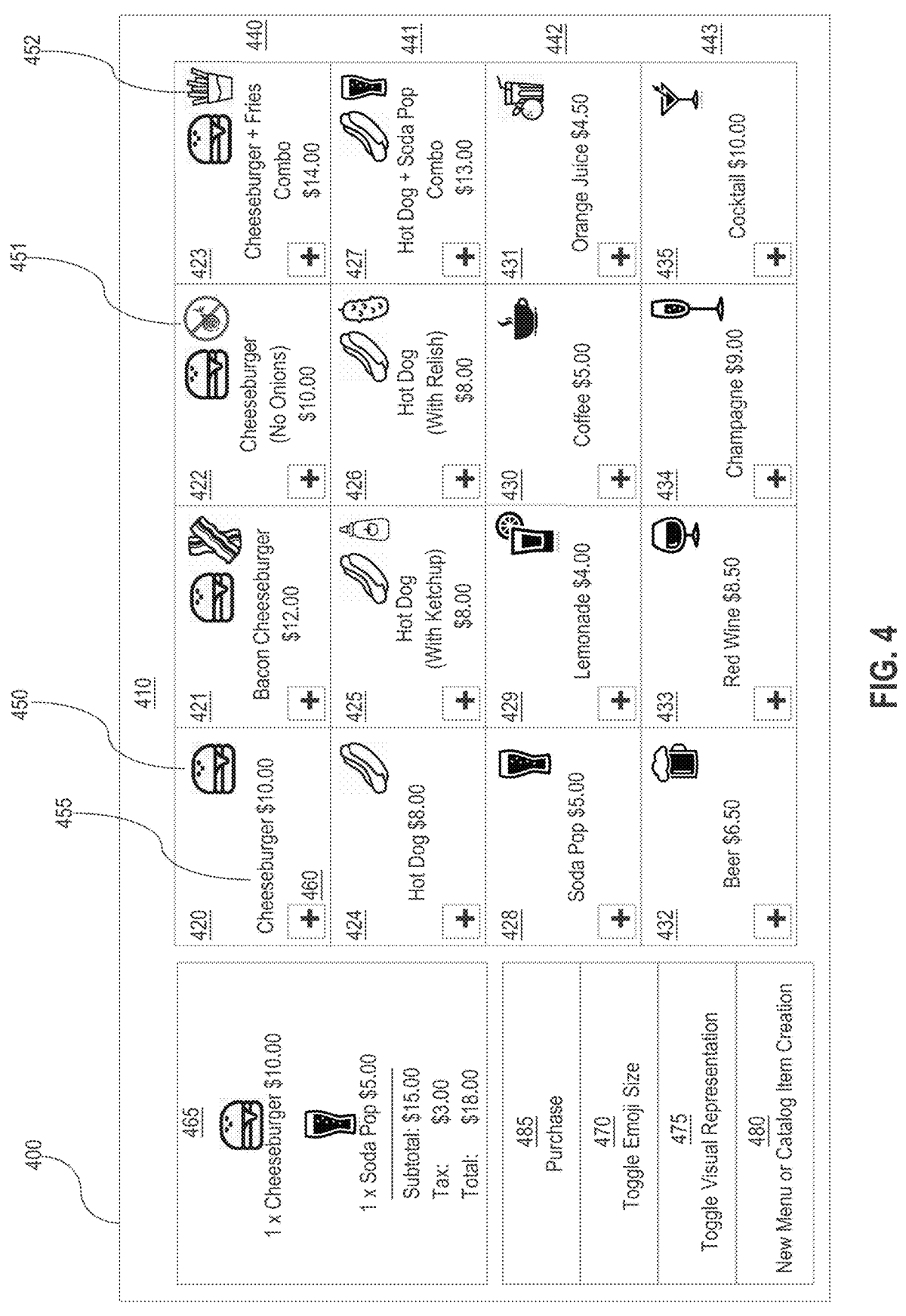

In some embodiments, each button of the plurality of the concurrently displayed buttons comprises a border and at least one emoji within the border, where the at least one emoji represents the digital order associated with each button. For example, a particular button associated with a digital order of a hot dog may be represented with a hot dog emoji within the border of the particular button, where the hot dog emoji may be a digital ideogram in the form of a glyph, icon, or symbol that visually resembles a hot dog. In some embodiments, emojis are inserted inline with text because each emoji corresponds to a Unicode Standard code point (a hexadecimal number). For example, a hot dog emoji may be inserted inline with text by using the Unicode Standard code point U+1F32D. FIG. 4 illustrates an example and is further described in other sections. In some embodiments, a second emoji may be displayed within the border of a particular button to represent an additional digital order of a respective menu or catalog item. For example, a particular button associated with a digital order of a hamburger and fries combination may be represented with a first hamburger emoji and a second fries emoji within the border of the particular button. In some embodiments, a second emoji may be displayed within the border of the particular button to represent a modification of a digital order of a respective menu or catalog item associated with the particular button. For example, a particular button associated with a digital order of a hamburger with no onions may be represented with a first emoji of a hamburger and second emoji of a crossed-out onion within the border of the particular button. In some embodiments, each button of the plurality of the concurrently displayed buttons comprises both at least one emoji and at least one line of copy within its border, where the at least one line of copy and the at least one emoji do not overlap in display within the border of each button.

Figure 5:
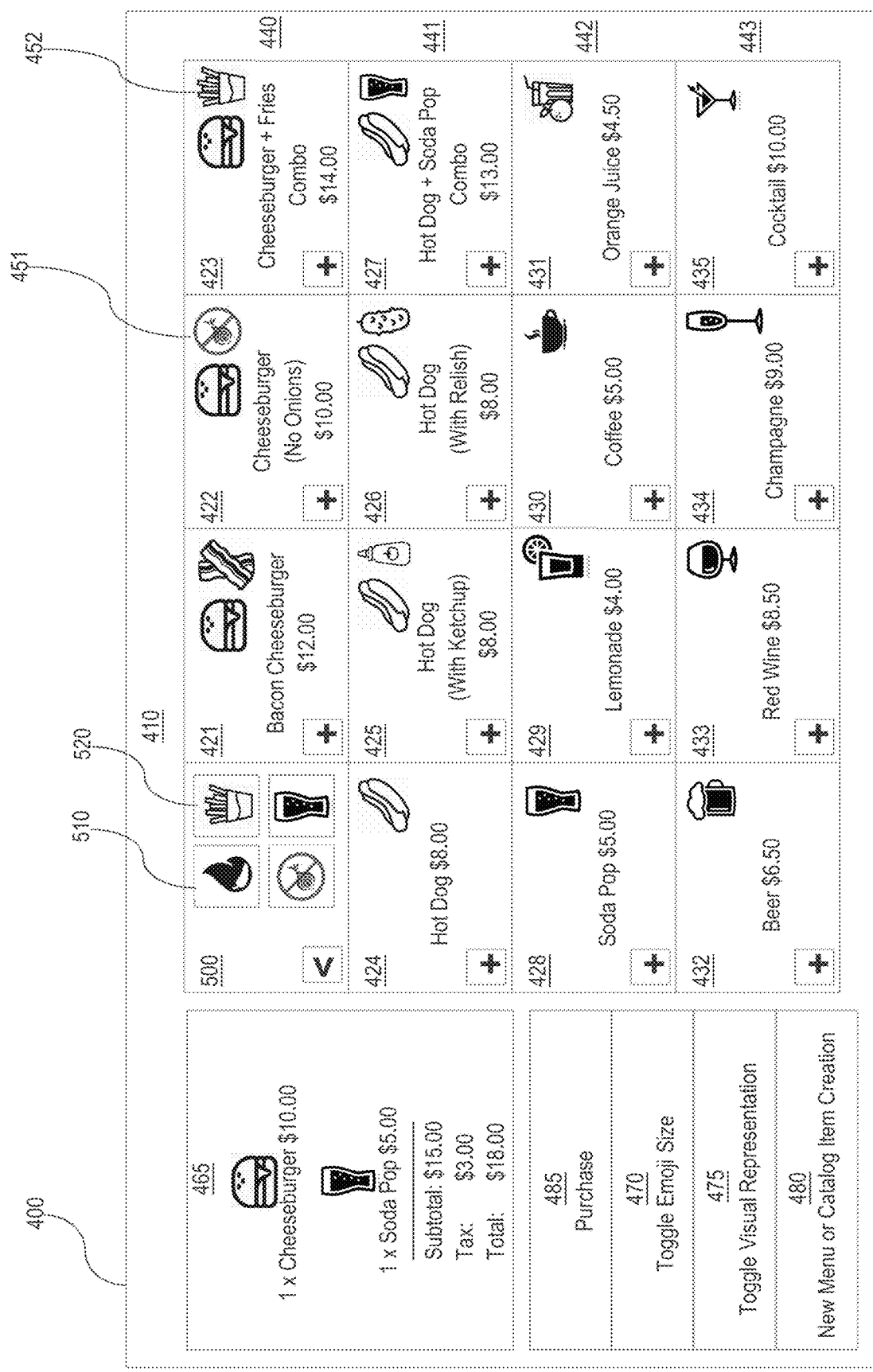
FIG. 5 illustrates an example GUI of a POS computer system comprising a sub-menu interface according to an embodiment.

In some embodiments, custom modifications of a digital order of respective menu or catalog items associated with a particular button are set using a sub-menu interface. FIG. 5 illustrates an example and is further described in other sections. In some embodiments, each button of the plurality of concurrently displayed buttons presents a selectable graphical element within the border of each button, where selecting the graphical element will open a sub-menu interface comprising one or more custom modification options of the digital order associated with the particular button. For example, a particular button associated with a digital order of a hamburger may present a graphical element within its border, where selecting the graphical element may open a sub-menu interface comprising one or more custom modifications to the digital order of the hamburger, such as 'no onions,' 'add bacon,' and 'make spicy.' In some embodiments, the sub-menu interface comprises one or more selectable buttons, where each button is associated with a particular custom modification option for the particular digital order. Each button of the one or more selectable buttons within the sub-menu interface may comprise a border and one or more emojis within the border representing the corresponding custom modification. For example, a selectable button associated with an 'add bacon' custom modification may display, within its border, an emoji of bacon. Additionally, or alternatively, each button of the one or more selectable buttons may comprise a text description within its border representing the corresponding custom modification. In some embodiments, in response to selecting a graphical element within the border of a particular button, the sub-menu interface is displayed within the border of the particular button. In some embodiments, the sub-menu interface is displayed in a separate interface, such as a pop-up window.

Returning to FIG. 2, at step 260, the process is programmed to update the display of the GUI to indicate that the respective menu or catalog item for the particular button is added to a checkout cart comprising an order list. In some embodiments, the screen, comprising the GUI used to indicate that the respective menu or catalog item for the particular button is added to the checkout cart, is the same screen that displays the plurality of concurrently displayed buttons. The checkout cart, indicating an order list for respective menu or catalog items, may be represented as a separate window within the GUI. FIG. 4 and FIG. 5 illustrate examples and is further described in other sections. In some embodiments, each added digital order indicated in the checkout cart comprises the corresponding one or more emojis associated with the added digital order. For example, in response to a selection of a digital order of a bacon cheeseburger, a checkout cart window within the GUI may indicate a digital order of a bacon cheeseburger accompanied by a first emoji of a cheeseburger and a second emoji of bacon within the checkout cart window. Additionally, or alternatively, each added digital order indicated in the checkout cart may comprise the corresponding text description of the digital order In some embodiments, a device comprises two or more screens, including a first screen comprising a first GUI for indicating that the respective menu or catalog item for the particular button is added to the checkout cart and a second screen comprising a second GUI to display the plurality of concurrently displayed buttons. In various further embodiments, the first screen comprising a first GUI for indicating that the respective menu or catalog item for the particular button is added to the checkout cart is operable by human vendor and the second screen comprising a second GUI is operable by a human customer for viewing the plurality of concurrently displayed buttons.

In some embodiments, the plurality of concurrently displayed buttons is displayed in the GUI in response to user input specifying that the GUI should display the plurality of concurrently displayed buttons. For example, a pre-generated version of the plurality of buttons may be stored electronically. The pre-generated plurality of buttons may stay in storage until a user interacting with a GUI of a device specifies that the plurality of buttons should be shown. The plurality of buttons may be shown in any sufficient display of size, arrangement, form, color, and/or display format necessary to facilitate the processes as described herein. In some embodiments, the plurality of concurrently displayed buttons is modifiable based on user interaction with the GUI. For example, the plurality of concurrently displayed buttons may scale to a larger size in response to user input in the GUI such as a tap or scroll of the fingers by a user. Conversely, the plurality of concurrently displayed buttons may scale to a smaller size in response to user input in the GUI such as a double-tap or scroll of the fingers by a user.

In some embodiments, the sizes of the one or more emojis displayed within the borders of each button may be modified based on user interaction with the GUI. For example, the GUI may comprise a selectable button which, when selected, toggles the sizes of displayed emojis between a large size and a small size. In some embodiments, the GUI comprises a slider for modifying the sizes of the displayed emojis. In some embodiments, the GUI comprises a selectable button which, when selected, cycles between one or more different visual representations of digital orders associated with each button. For example, the GUI may comprise a selectable button which, in response to a first interaction, may cause display, within the borders of each button, only one or more emojis that represent the corresponding digital order; in response to a second interaction, may cause display, within the borders of each button, only a text description that represent the corresponding digital order; and in response to a third interaction, may cause display, within the borders of each button, both one or more emojis and a text display that represent the corresponding digital order. FIG. 4 and FIG. 5 illustrate examples and is further described in other sections.

Figure 3:
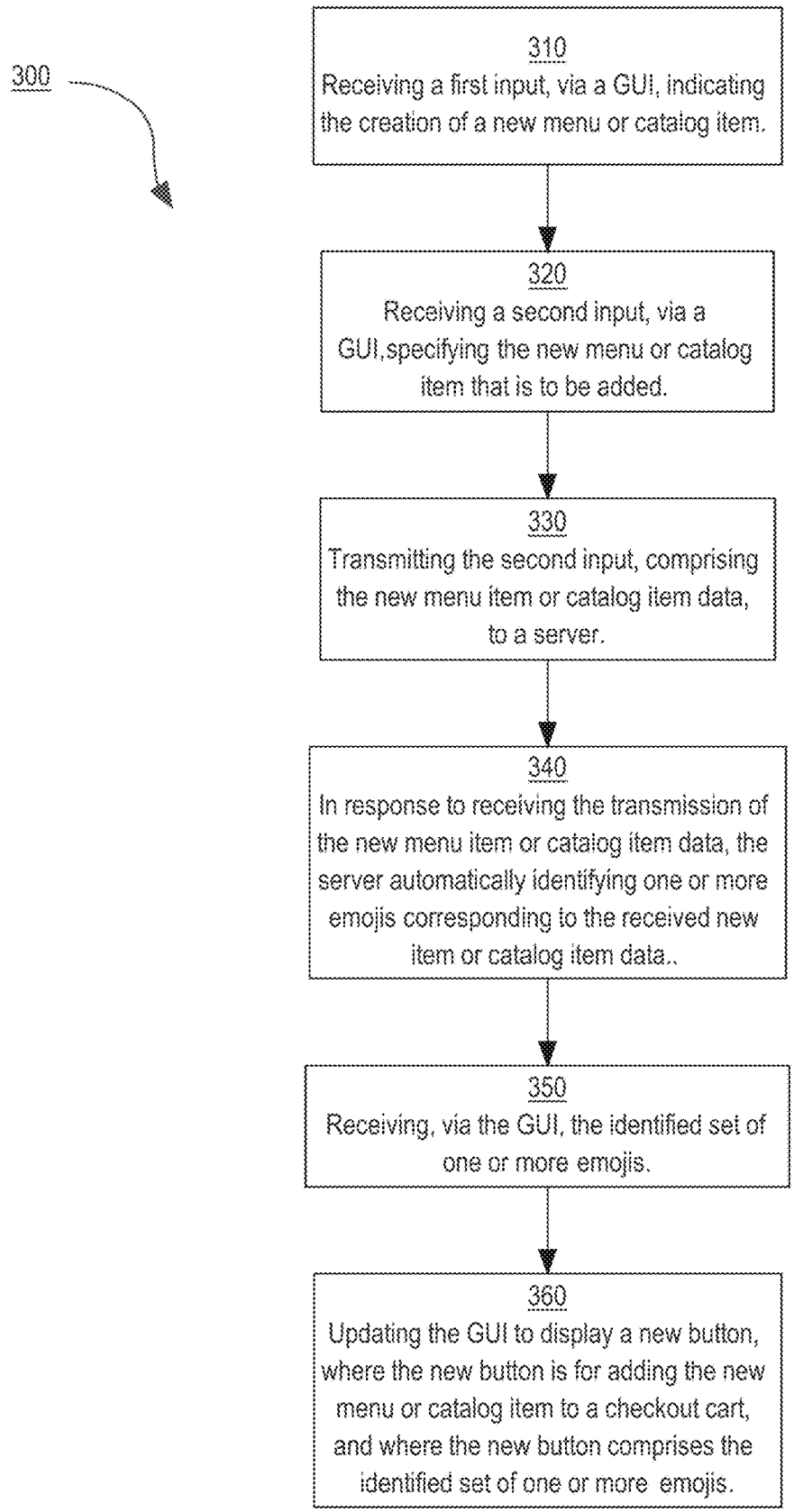
FIG. 3 illustrates an example of new menu or catalog item creation process according to an embodiment.

FIG. 3 illustrates an example of new menu or catalog item creation process according to an embodiment.

Figure 6:
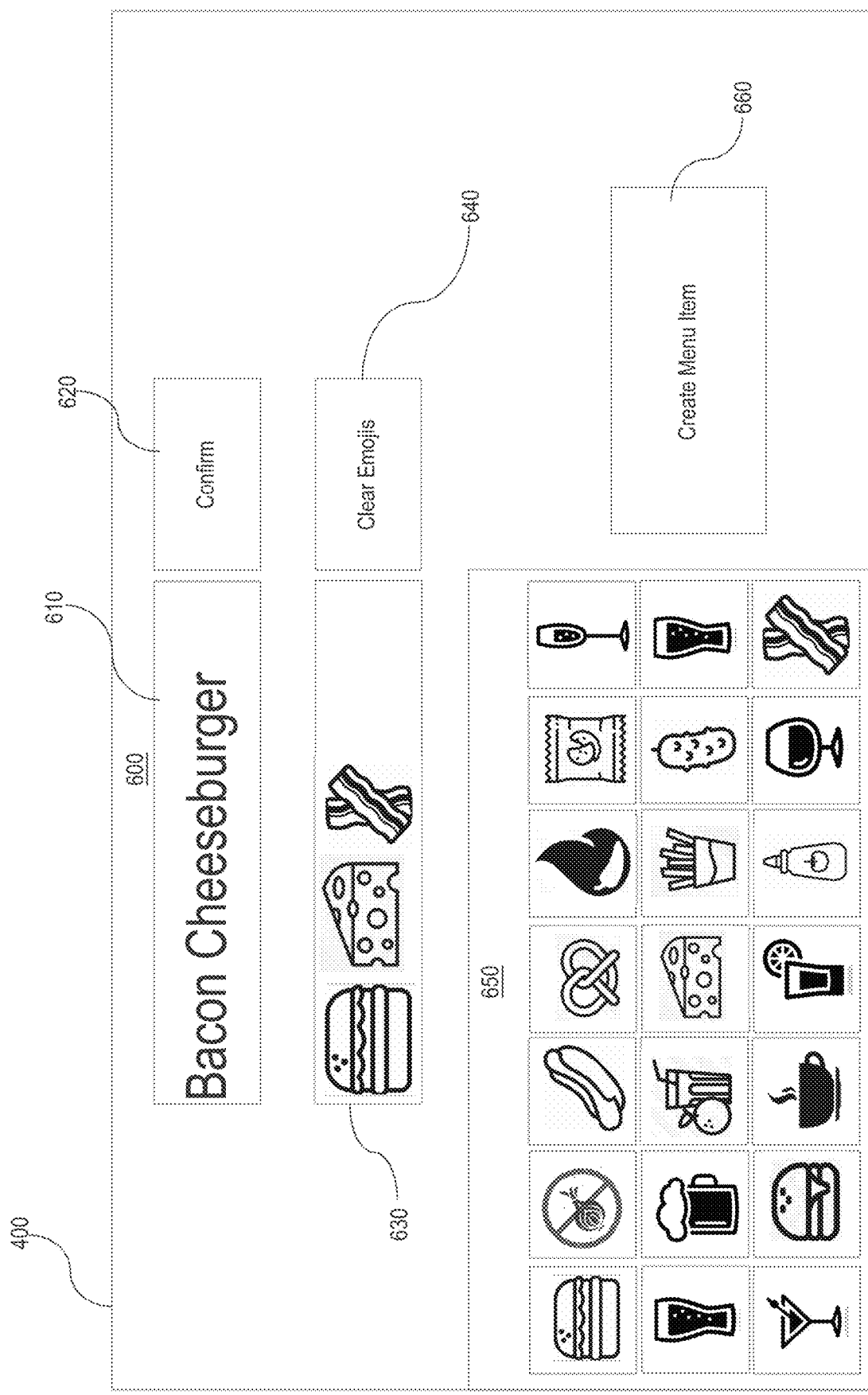
FIG. 6 illustrates an example new menu or catalog item creation interface according to an embodiment.

The example process 300 depicted in FIG. 3 starts, at step 310, by receiving a first input, via a GUI, indicating the creation of a new menu or catalog item. For example, the example GUI illustrated in process 200 and further illustrated in FIG. 4 and FIG. 5 may comprise a selectable button which, when selected, opens a new menu or catalog item creation interface. FIG. 6 illustrates an example and is further described in other sections.

At step 320, a second input is received, via a GUI, specifying the new menu or catalog item that is to be added. The second input may be a text input that describes the specific new menu or catalog item that is to be added. For example, if the specific new menu or catalog item that is to be added is a bacon cheeseburger, the second received input may be text input "Bacon Cheeseburger." In some embodiments, the new menu or catalog item creation interface comprises a text input box which allows the text input that describes the specific new menu or catalog item.

At step 330, the second input comprising the new menu item or catalog item data is transmitted to a server. The transmission of the new menu item or catalog item data may be in response to an input via a GUI. For example, the transmission of the new menu item or catalog data may be in response to selecting a selectable button in the new menu or catalog item creation interface after the input of a text description of the new menu or catalog item. As illustrated in FIG. 1, the transmission of the new menu item or catalog data to a server 114 may be performed by a transaction generation device 104 comprising a GUI over a network 102. Network 102 may be coupled to server 114. Server 114 may comprise data storage 116. In some embodiments, data storage 116 comprises one or more databases containing emoji and menu or catalog item digital data. Server 114 may comprise database lookup instructions 118. Database lookup instructions 118 may facilitate the search for one or more emojis corresponding to a text input. Server 114 may also comprise mapping instructions 120. Digital data representing one or more emojis may be mapped to one or more menu or catalog items. Mapping instructions 120 may facilitate a mapping, in a database, between one or more emojis and text input representing one or more menu or catalog items.

At step 340, in response to receiving the transmission of the new menu item or catalog item data, the server automatically identifies one or more emojis corresponding to the received new item or catalog item data. In some embodiments, the server comprises a data storage which further comprises a database containing emoji and menu or catalog item digital data. The database may contain data that maps menu or catalog items with a set of one or more emojis. In some embodiments, each menu or catalog item is associated with a menu item ID and each emoji is associated is associated with an emoji ID. Thus, the database may contain data that maps menu IDs with a set of one or more emoji IDs. In some embodiments, the database may contain data that maps menu item IDs with: 1) the corresponding item or catalog item display name, 2) a variable-length list of tags associated with the corresponding item or catalog item, and 3) a set of one or more emojis associated the corresponding item or catalog item display name. For example, the database may contain data that maps menu item ID #001 with 1) the display name "Bacon Cheeseburger," 2) a variable-length list of tags which includes 'burger,' 'cheese,' and 'bacon,' and 3) a set of emojis comprising a burger emoji, a cheese emoji, and a bacon emoji. In some embodiments, based on the mappings provided in the database, mapped emojis are automatically caused to display whenever the associated menu item ID is invoked or used in the system.

Returning to step 340, the received new menu item or catalog item data may be a text description of the corresponding new menu item or catalog item. For example, the received new menu item or catalog item data may be "Bacon Cheeseburger." In response to receiving the new menu item or catalog item data, the server may automatically parse the received data into identifiable tags. For example, the server may automatically parse "Bacon Cheeseburger" into three identifiable tags: 'bacon,' 'cheese,' and 'burger.' In some embodiments, the server may instead identify "Bacon Cheeseburger" as a single identifiable tag. In some embodiments, the server then automatically searches and retrieves from a database, which contains emoji and menu or catalog item digital data, for a set of one or more emojis mapped to the identified tags derived from the received input. For example, based on the tags 'bacon,' 'cheese,' and 'burger,' the server may identify a bacon emoji that is mapped to the tag 'bacon' in the database, a cheese emoji that is mapped to the tag 'cheese' in the database, and a burger emoji that is mapped to the tag 'burger' in the database. The server may also identify "Bacon Cheeseburger" as a single tag and identify a single "Bacon Cheeseburger" emoji if one exists in the database.

At step 350, the identified set of one or more emojis based on the received second is input is automatically suggested via a GUI. In some embodiments, the identified set of one or more emojis is caused to display in the new menu or catalog item creation interface. FIG. 6 illustrates an example and is further described in other sections. In further embodiments, if no sets of emojis that correspond to the new menu or catalog item are able to be identified in the database, a user may manually select a set of one or more emojis from a plurality of presented emojis to be mapped with the new menu or catalog item. For example, if no sets of emojis that correspond to "Bacon Cheeseburger" are identified in the database, a user may manually select a bacon emoji, a cheese emoji, and a burger emoji from a plurality of presented emojis to be mapped to "Bacon Cheeseburger."

In some embodiments, the manually selected set of one or more emojis and the corresponding mapped new menu or catalog item data is sent to a server comprising a database and stored. A new data entry may be created in the database comprising a new menu item ID with: 1) the corresponding new item or catalog item display name based on input, 2) a variable-length list of tags associated with the corresponding new item or catalog item, and 3) the manually selected set of one or more emojis associated the corresponding new item or catalog item. Alternatively, even if a set of one or more emojis that correspond to the new menu or catalog item is identified and automatically suggested, a user may override the automatic suggestion of emojis and manually select a set of one or more emojis to be mapped with the new menu or catalog item. In some embodiments, an existing data entry associated with a menu or catalog item may be updated based on manually selected sets of one or more emojis. For example, if "Bacon Cheeseburger" is currently mapped to a burger emoji and a bacon emoji in the database, the "Bacon Cheeseburger" mapping may be updated to map to a burger emoji, a bacon emoji, and a cheese emoji based on a set of manually selected emojis by a user. In some embodiments, the manually selected set of one or more emojis and the corresponding mapped new menu or catalog item data is sent to a server and used to train a machine learning model to automatically map the most relevant sets of one or more emojis to the corresponding menu or catalog items. For example, a machine learning model may automatically map a menu or catalog item to the set of one or more emojis that is most frequently manually selected by users to represent the menu or catalog item within certain time frame.

At step 360, the GUI is updated to cause to display a new button, where the new button is for adding the new menu or catalog item to a checkout cart. The new button may have a border and the corresponding identified one or more emojis displayed within the border. Additionally, or alternatively, the inputted text description of the new menu or catalog item may be displayed within the border of the button.

4. EXAMPLE ENVIRONMENTS

FIG. 4 illustrates an example GUI of a point-of-sale computer system according to an embodiment. Specifically, FIG. 4 illustrates a GUI on a POS terminal during displaying a plurality of buttons, each button associated with a digital order for a menu or catalog item. POS terminal 400 may be any device capable of generating digital order data, such as a transaction generation device 104. POS terminal 400 is shown here as a device comprising a screen and chassis to hold the screen, however any device which is sufficient to function as a POS terminal may be used. POS terminal 400 comprises a GUI 410 upon which a user of POS terminal 400 may interact with an interface, such as an interface generated by interface instructions 108. GUI 410 may be implemented on a touchscreen that is simultaneously capable of displaying and receiving input to the screen.

GUI 410 may contain thereon any number of visual items or interactive icons which facilitate the generation of a digital order. The interface illustrated in FIG. 4 shows a plurality of concurrently displayed buttons 420-435, specific rows of displayed buttons 440-443, displayed emojis 450-452 within buttons, text description 455 within a particular button, sub-menu button 460 within a particular button, order list 465, toggle emoji size button 470, toggle visual representation button 475, new menu or catalog item creation button 480, and purchase button 485 as examples. The plurality of buttons 420-435 may be any interactive input with which a user may interact with GUI 410 to facilitate the generation of a digital order. For example, FIG. 4 illustrates the plurality of buttons 420 as a button on a touchscreen of a POS terminal having the text description 455 "Cheeseburger $10.00" and an emoji 450 of a cheeseburger. The plurality of buttons 420-435 may be displayed in a grid of at least for rows and at least four columns. In some embodiments, each row or column of the grid corresponds to a class of menu or catalog items. For example, a first row 440 corresponds to burgers and burger combinations, a second row 441 corresponds to hot dogs and hot dog combinations, a third row 442 corresponds to non-alcoholic drinks, and a fourth row 443 corresponds to alcoholic drinks.

Each button of the plurality of buttons 420-435 may be of a size of which is enough to display at least one line of text description where the text of the text description has a minimum font size in points. In some embodiments, the size of the button is such that it allows for no more than four lines of copy. For example, a particular button 420 may be of a size which that is enough to display the one-line text description 455 "Cheeseburger $10.00," which is of a minimum font size of 18-point. A particular button 420 may also have at least a color contrast ratio relative to a background of the button 420. In some embodiments, the minimum color contrast ratio relative to a background is 3:1. This button 420 may represent an input which will add a food item such as a "Cheeseburger" to a list of goods for the digital order. The price specification of "$10.00" may add a price value to a cumulative list of pricing items that will be the subject of the later transaction.

A particular button 420 may comprise, within its border, at least one emoji 450 which represents the digital order associated with the particular button 420. For example, FIG. 4 illustrates button 420 comprising a cheeseburger emoji 450, where the cheeseburger emoji represents to the digital order of "Cheeseburger" associated with the particular button 420. A particular button 422 may also comprise a second emoji 451 to indicate a modification to the digital order of the respective menu or catalog item. For example, FIG. 4 illustrates button 422 comprising a second emoji 451 indicating a "no onions" modification to the order of a cheeseburger. A particular button 423 may comprise a second emoji 452 to indicate an additional respective menu or catalog item. For example, FIG. 4 illustrates button 423 comprising a second emoji 452 indicating an additional order of fries to go with the order of a cheeseburger. In the example of FIG. 4, the borders of buttons (e.g., 420) are depicted as rectangular outlines of the buttons. However, other outline shapes are possible such as rounded rectangles and ellipses, for example. In some embodiments, a button 420 may comprise a selectable sub-menu button 460 within the border of the button 420, where selecting the sub-menu button 460 will open a sub-menu interface comprising one or more custom modifications options of the digital order associated with the button 420. The sub-menu interface is further illustrated in FIG. 5.

Order list 465 may be any static or interactive displayed list showing a number of items which are currently part of a potential digital order. In some embodiments, order list 455 comprises only text descriptions of the items part of a potential digital order. Additionally, or alternatively, order list 455 may comprise emojis associated with the items part of a potential digital order. For example, FIG. 4 illustrates order list 465 as a digital list containing the items "Cheeseburger $10.00" and "Soda pop $5.00," as well as their corresponding emojis. The addition of these items to the list may be made in response to interactive input of corresponding buttons 420-435 on the GUI 410. In some embodiments, order list 465 contains the cumulative pricing information for items which are added to the list. For example, order list 465 shows "Subtotal," "Tax" and "Total" fields representing the cumulative prices of all items in the list. In some embodiments, a user may interact with the order list 465 to add or remove items or change the orientation of size of the list in response to some user input. Purchase button 485 may be an interactive button that finalizes an order when pressed. For example, when a user is satisfied with the contents of order list 455, they may press purchase button 485 labeled "Purchase" to complete the transaction. Toggle emoji size button 470 may be an interactive button that modifies the sizes of emojis displayed in the plurality of buttons 420-435. In some embodiments, interaction with the emoji size button 470 toggles the sizes of displayed emojis between a large size and a small size. In some embodiments, the GUI 410 comprises a slider for modifying the sizes of the displayed emojis. Toggle visual representation button 475, when selected, may cycles between one or more different visual representations of digital orders associated with the plurality of buttons 420-435. For example, a first interaction with the toggle visual representation button 475 may cause display, within the borders of each button, only emojis that represent the corresponding digital order; a second interaction may cause display, within the borders of each button, only a text description that represent the corresponding digital order; and a third interaction may cause display, within the borders of each button, both one or more emojis and a text display that represent the corresponding digital order. In some embodiments, each different visual representation of digital orders is triggered by a separate button. New menu or catalog item creation button 480, when selected may trigger the display of new menu or catalog item creation interface. The new menu or catalog item creation interface is further illustrated in FIG. 6.

FIG. 5 illustrates an example GUI of a point-of-sale computer system comprising a sub-menu interface according to an embodiment. Specifically, FIG. 5 illustrates a GUI 410 on a POS terminal after opening a sub-menu interface 500 for a particular button 420. In some embodiments, a button 420 may comprise a selectable sub-menu button 460 within the border of the button 420, where selecting the sub-menu button 460 will open a sub-menu interface 500 comprising one or more custom modifications options of the digital order associated with the button 420. For example, a particular button 420 associated with a digital order of a cheeseburger may have a sub-menu interface 500 comprising one or more custom modifications to the digital order of the hamburger, such as a "make spicy" modification 510 and a "add fries" modification 520. Each modification may be added by selecting the corresponding button in the sub-menu interface. Each button of the one or more selectable buttons within the sub-menu interface may comprise a border and one or more emojis within the border representing the corresponding custom modification. Additionally, or alternatively, each button of the one or more selectable buttons may comprise a border and a text description within the border representing the corresponding custom modification. As illustrated in FIG. 5, the sub-menu interface 500 may be presented within the borders of the particular button 420. In some embodiments, the sub-menu interface 500 is displayed in a separate interface, such as a pop-up window.

FIG. 6 illustrates an example new menu or catalog item creation interface according to an embodiment. Specifically, FIG. 6 illustrates an interface 600 used for the creation of new menu or catalog item to be displayed in the GUI 410. The display of the new menu or catalog item creation interface 600 may be triggered by the selection of the new menu or catalog item creation button 480. Interface 600 may contain thereon any number of visual items or interactive icons which facilitate the creation of a new menu or catalog item. The interface illustrated in FIG. 6 shows a text input box 610, text input confirmation button 620, a generated emoji display 630, a clear emoji button 640, a plurality of selectable emojis 650, and a creation button 660.

A new menu or catalog item may be based on a text input that describes the specific new menu or catalog item that is to be added. In some embodiments, the new menu or catalog item creation interface 600 comprises a text input box 610 which allows a user to input text that describes the specific new menu or catalog item. For example, if the specific new menu or catalog item that is to be added is bacon cheeseburger, a user may enter the text "Bacon Cheeseburger" into the text input box. After entering text into the text input box, a user may select the text input confirmation button 620 to automatically generate a set of suggested one or more emojis corresponding to the new menu or catalog item that is to be added. In some embodiments, the text input comprising the new menu item or catalog item data is transmitted to a server. In response to receiving the transmission of the new menu item or catalog item data, the server may automatically identify one or more emojis corresponding to the received new item or catalog item data. The identified set of one or more emojis based on the text input may then be displayed in the generated emoji display 630. If one or more emojis are displayed in the generated emoji display 630, a user may select the creation button 660 to complete the creation process. In some embodiments, if no sets of emojis that correspond to the new menu or catalog item are able to be identified in the database, the generated emoji display 630 may remain empty after selection of the text input confirmation button 620. In some embodiments, a prompt may appear to notify the user that no valid emojis were identified. A user may then manually select a set of one or more emojis from a plurality of selectable emojis 650 to be mapped with the new menu or catalog item. For example, if no sets of emojis that correspond to "Bacon Cheeseburger" are identified in the database, a user may manually select a 'bacon' emoji, a 'cheese' emoji, and a 'burger' emoji from a plurality of selectable emojis 650 to be mapped to "Bacon Cheeseburger." The manually selected emojis may appear in the generated emoji display 630. Alternatively, even if a set of one or more emojis that correspond to the new menu or catalog item is identified and automatically suggested in the generated emoji display 630, a user may override the automatic suggestion of emojis and manually select a set of one or more emojis from the plurality of selectable emojis 650 to be mapped with the new menu or catalog item. A user may at any time select the clear emoji button 640 to remove all displayed emojis in the generated emoji display 630.

5. HARDWARE OVERVIEW

In some embodiments, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

Figure 7:
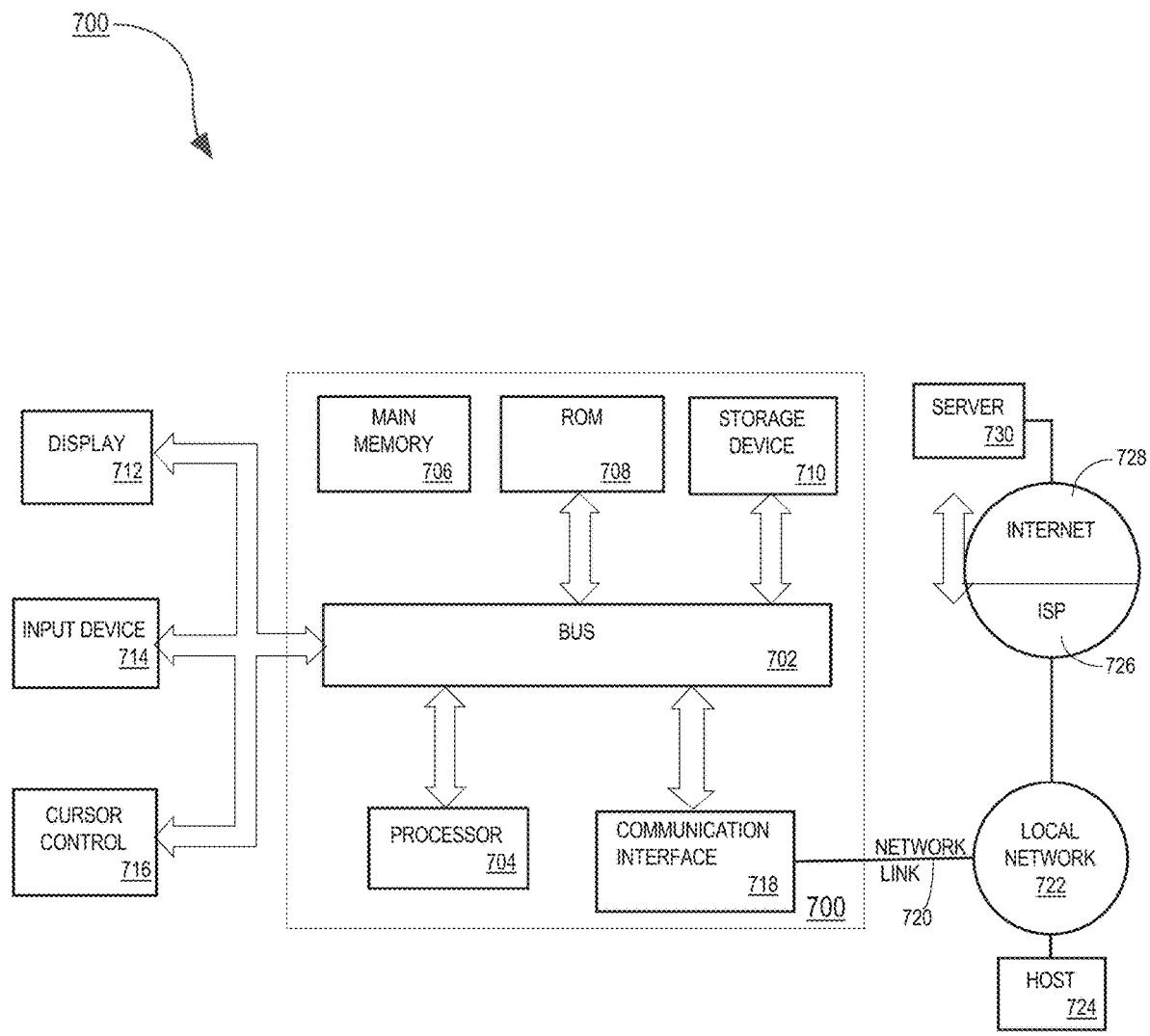
FIG. 7 illustrates an example computer system with which an embodiment may be implemented.

For example, FIG. 7 is a block diagram that illustrates a computer system 700 upon which an embodiment may be implemented. Computer system 700 includes a bus 702 or other communication mechanism for communicating information, and a hardware processor 704 coupled with bus 702 for processing information. Hardware processor 704 may be, for example, a general-purpose microprocessor.

Computer system 700 also includes a main memory 706, such as a random-access memory (RAM) or other dynamic storage device, coupled to bus 702 for storing information and instructions to be executed by processor 704. Main memory 706 also may be used for storing temporary variables or other intermediate information during execution of instructions to be executed by processor 704. Such instructions, when stored in non-transitory storage media accessible to processor 704, render computer system 700 into a special-purpose machine that is customized to perform the operations specified in the instructions.

Computer system 700 further includes a read only memory (ROM) 708 or other static storage device coupled to bus 702 for storing static information and instructions for processor 704. A storage device 710, such as a magnetic disk, optical disk, or solid-state drive is provided and coupled to bus 702 for storing information and instructions.

Computer system 700 may be coupled via bus 702 to a display 712, such as a cathode ray tube (CRT), for displaying information to a computer user. An input device 714, including alphanumeric and other keys, is coupled to bus 702 for communicating information and command selections to processor 704. Another type of user input device is cursor control 716, such as a mouse, a trackball, or cursor direction keys for communicating direction information and command selections to processor 704 and for controlling cursor movement on display 712. This input device typically has two degrees of freedom in two axes, a first axis (e.g., x) and a second axis (e.g., y), that allows the device to specify positions in a plane.

Computer system 700 may implement the techniques described herein using customized hard-wired logic, one or more ASICs or FPGAs, firmware and/or program logic which in combination with the computer system causes or programs computer system 700 to be a special-purpose machine. In some embodiments, the techniques herein are performed by computer system 700 in response to processor 704 executing one or more sequences of one or more instructions contained in main memory 706. Such instructions may be read into main memory 706 from another storage medium, such as storage device 710. Execution of the sequences of instructions contained in main memory 706 causes processor 704 to perform the process steps described herein. In alternative embodiments, hard-wired circuitry may be used in place of or in combination with software instructions.

The term "storage media" as used herein refers to any non-transitory media that store data and/or instructions that cause a machine to operate in a specific fashion. Such storage media may comprise non-volatile media and/or volatile media. Non-volatile media includes, for example, optical disks, magnetic disks, or solid-state drives, such as storage device 710. Non-volatile media may also include persistent memory, such as MRAM or PCM, like 7DXPoint from Intel which can be used as a part of main memory. Volatile media includes dynamic memory, such as main memory 706. Common forms of storage media include, for example, a floppy disk, a flexible disk, hard disk, solid-state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 702. Transmission media can also take the form of acoustic or light waves, such as those generated during radio-wave and infra-red data communications.

Various forms of media may be involved in carrying one or more sequences of one or more instructions to processor 704 for execution. For example, the instructions may initially be carried on a magnetic disk or solid-state drive of a remote computer. The remote computer can load the instructions into its dynamic memory and send the instructions over a telephone line using a modem. A modem local to computer system 700 can receive the data on the telephone line and use an infra-red transmitter to convert the data to an infra-red signal. An infra-red detector can receive the data carried in the infra-red signal and appropriate circuitry can place the data on bus 702. Bus 702 carries the data to main memory 706, from which processor 704 retrieves and executes the instructions. The instructions received by main memory 706 may optionally be stored on storage device 710 either before or after execution by processor 704.

Computer system 700 also includes a communication interface 718 coupled to bus 702. Communication interface 718 provides a two-way data communication coupling to a network link 720 that is connected to a local network 722. For example, communication interface 718 may be an integrated services digital network (ISDN) card, cable modem, satellite modem, or a modem to provide a data communication connection to a corresponding type of telephone line. As another example, communication interface 718 may be a local area network (LAN) card to provide a data communication connection to a compatible LAN. Wireless links may also be implemented. In any such implementation, communication interface 718 sends and receives electrical, electromagnetic or optical signals that carry digital data streams representing various types of information.

Network link 720 typically provides data communication through one or more networks to other data devices. For example, network link 720 may provide a connection through local network 722 to a host computer 724 or to data equipment operated by an Internet Service Provider (ISP) 726. ISP 726 in turn provides data communication services through the worldwide packet data communication network now commonly referred to as the "Internet" 728. Local network 722 and Internet 728 both use electrical, electromagnetic or optical signals that carry digital data streams. The signals through the various networks and the signals on network link 720 and through communication interface 718, which carry the digital data to and from computer system 700, are example forms of transmission media.

Computer system 700 can send messages and receive data, including program code, through the network(s), network link 720 and communication interface 718. In the Internet example, a server 730 might transmit a requested code for an application program through Internet 728, ISP 726, local network 722 and communication interface 718.

The received code may be executed by processor 704 as it is received, and/or stored in storage device 710, or other non-volatile storage for later execution.

6. SOFTWARE OVERVIEW

Figure 8:
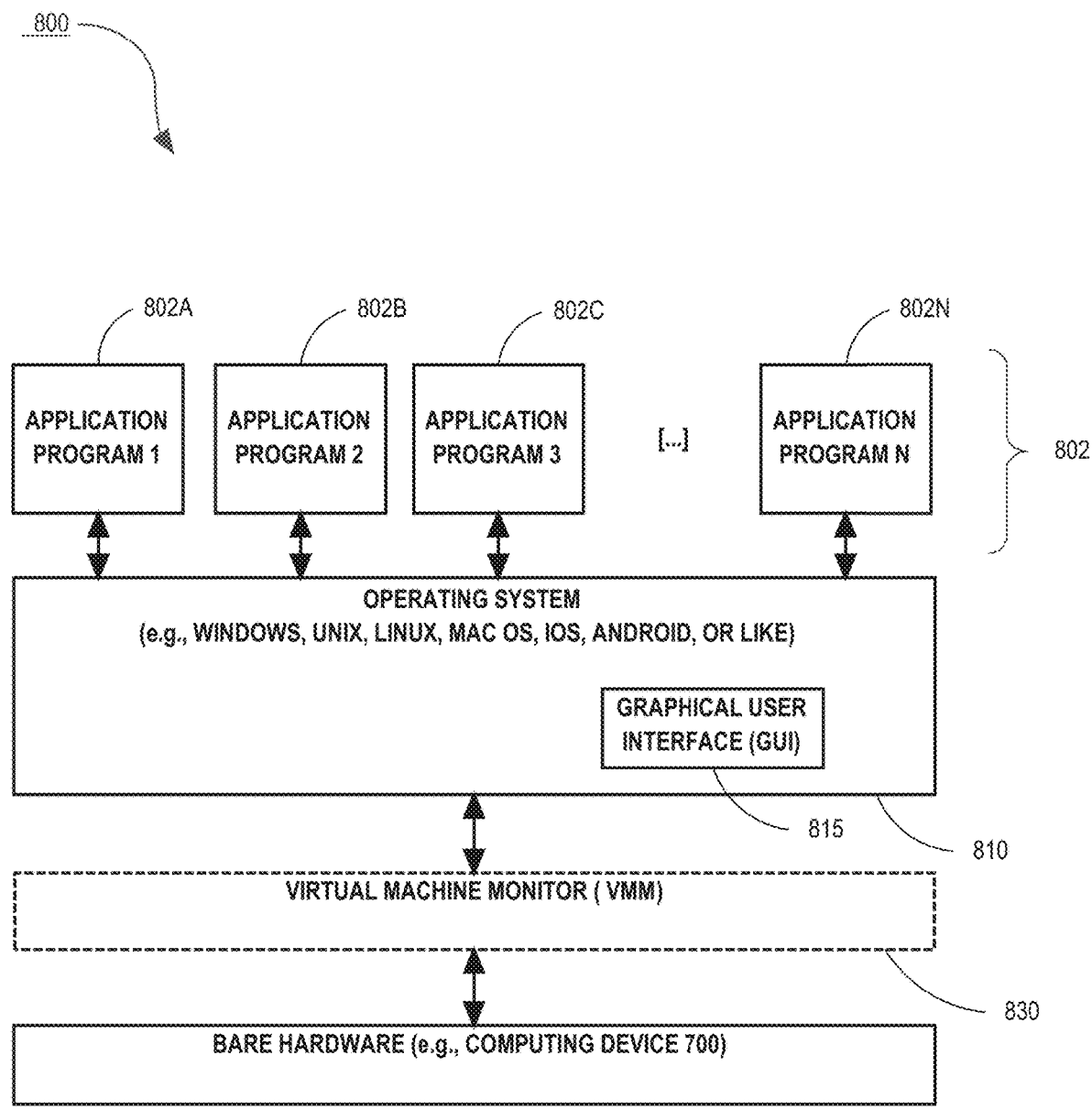
FIG. 8 illustrates an example software system with which an embodiment may be implemented.

FIG. 8 is a block diagram of a software system 800 that may be employed for controlling the operation of computer system 800. Software system 800 and its components, including their connections, relationships, and functions, is meant to be exemplary only, and not meant to limit implementations of the example embodiment(s). Other software systems suitable for implementing the example embodiment(s) may have different components, including components with different connections, relationships, and functions.

Software system 800 is provided for directing the operation of computer system 500. Software system 800, which may be stored in system memory (RAM) and on fixed storage (e.g., hard disk or flash memory) 710, includes a kernel or operating system (OS) 810.

The OS 810 manages low-level aspects of computer operation, including managing execution of processes, memory allocation, file input and output (I/O), and device I/O. One or more application programs, represented as 802A, 802B, 802C . . . 802N, may be "loaded" (e.g., transferred from fixed storage into memory) for execution by the system. The applications or other software intended for use on system may also be stored as a set of downloadable computer-executable instructions, for example, for downloading and installation from an Internet location (e.g., a Web server, an app store, or other online service).

Software system 800 includes a graphical user interface (GUI) 815, for receiving user commands and data in a graphical (e.g., "point-and-click" or "touch gesture") fashion. These inputs, in turn, may be acted upon by the system 700 in accordance with instructions from operating system 810 and/or application(s) 802. The GUI 815 also serves to display the results of operation from the OS 810 and application(s) 802, whereupon the user may supply additional inputs or terminate the session (e.g., log off).

OS 810 can execute directly on bare hardware (e.g., processor(s)) utilizing system 800. Alternatively, a hypervisor or virtual machine monitor (VMM) 830 may be interposed between the bare hardware and the OS 810. In this configuration, VMM 830 acts as a software "cushion" or virtualization layer between the OS 810 and the bare hardware of the system.

VMM 830 instantiates and runs one or more virtual machine instances ("guest machines"). Each guest machine comprises a "guest" operating system, such as OS 810, and one or more applications, such as application(s) 802, designed to execute on the guest operating system. The VMM 830 presents the guest operating systems with a virtual operating platform and manages the execution of the guest operating systems.

In some instances, the VMM 830 may allow a guest operating system to run as if it is running on the bare hardware of a system directly. In these instances, the same version of the guest operating system configured to execute on the bare hardware directly may also execute on VMM 830 without modification or reconfiguration. In other words, VMM 830 may provide full hardware and CPU virtualization to a guest operating system in some instances.

In other instances, a guest operating system may be specially designed or configured to execute on VMM 830 for efficiency. In these instances, the guest operating system is "aware" that it executes on a virtual machine monitor. In other words, VMM 830 may provide para-virtualization to a guest operating system in some instances.

The above-described basic computer hardware and software is presented for purpose of illustrating the basic underlying computer components that may be employed for implementing the example embodiment(s). The example embodiment(s), however, are not necessarily limited to any particular computing environment or computing device configuration. Instead, the example embodiment(s) may be implemented in any type of system architecture or processing environment that one skilled in the art, in light of this disclosure, would understand as capable of supporting the features and functions of the example embodiment(s) presented herein.

7. CLOUD COMPUTING

The term "cloud computing" is generally used herein to describe a computing model which enables on-demand access to a shared pool of computing resources, such as computer networks, servers, software applications, and services, and which allows for rapid provisioning and release of resources with minimal management effort or service provider interaction.

A cloud computing environment (sometimes referred to as a cloud environment, or a cloud) can be implemented in a variety of different ways to best suit different requirements. For example, in a public cloud environment, the underlying computing infrastructure is owned by an organization that makes its cloud services available to other organizations or to the general public. In contrast, a private cloud environment is generally intended solely for use by, or within, a single organization. A community cloud is intended to be shared by several organizations within a community; while a hybrid cloud comprises two or more types of cloud (e.g., private, community, or public) that are bound together by data and application portability.

Generally, a cloud computing model enables some of those responsibilities which previously may have been provided by an organization's own information technology department, to instead be delivered as service layers within a cloud environment, for use by consumers (either within or external to the organization, according to the cloud's public/private nature). Depending on the particular implementation, the precise definition of components or features provided by or within each cloud service layer can vary, but common examples include: Software as a Service (SaaS), in which consumers use software applications that are running upon a cloud infrastructure, while a SaaS provider manages or controls the underlying cloud infrastructure and applications. Platform as a Service (PaaS), in which consumers can use software programming languages and development tools supported by a PaaS provider to develop, deploy, and otherwise control their own applications, while the PaaS provider manages or controls other aspects of the cloud environment (i.e., everything below the run-time execution environment). Infrastructure as a Service (IaaS), in which consumers can deploy and run arbitrary software applications, and/or provision processing, storage, networks, and other fundamental computing resources, while an IaaS provider manages or controls the underlying physical cloud infrastructure (i.e., everything below the operating system layer). Database as a Service (DBaaS) in which consumers use a database server or Database Management System that is running upon a cloud infrastructure, while a DbaaS provider manages or controls the underlying cloud infrastructure, applications, and servers, including one or more database servers.

8. CONCLUSION

In the foregoing detailed description, some embodiments have been described with reference to numerous specific details that may vary from implementation to implementation. The detailed description and the figures are, accordingly, to be regarded in an illustrative rather than a restrictive sense.

A reference in the detailed description to some embodiments is not intended to mean that an embodiment is exclusive of another described embodiment, unless the context clearly indicates otherwise. Thus, a described embodiment may be combined with one or more other described embodiments in a particular implementation, unless the context clearly indicates otherwise.

In the foregoing detailed description and in the appended claims, although the terms first, second, etc. are, in some instances, used herein to describe various elements, these elements should not be limited by these terms. These terms are only used to distinguish one element from another. For example, a first user interface could be termed a second user interface, and, similarly, a second user interface could be termed a first user interface. The first user interface and the second user interface are both user interfaces, but they are not the same user interface.

As used in the foregoing detailed description and in the appended claims, the singular forms "a," "an," and "the" are intended to include the plural forms as well, unless the context clearly indicates otherwise. As used in the foregoing detailed description and in the appended claims, the term "and/or" refers to and encompasses any and all possible combinations of one or more of the associated listed items.

As used in the foregoing detailed description in the appended claims, the terms "based on," "according to," "includes," "including," "comprises," and/or "comprising," specify the presence of stated features, integers, steps, operations, elements, and/or components, but do not preclude the presence or addition of one or more other features, integers, steps, operations, elements, components, and/or groups thereof.

What is claimed is:

1. A method of updating a graphical user interface (GUI) of a point-of-sale computer system, the method comprising:
    receiving, via the GUI, a user selection of a particular button of a plurality of concurrently displayed buttons, each button of the plurality of concurrently displayed buttons for adding a respective menu or catalog item to a checkout cart, the particular button having a border and displaying within the border at least one line of copy and at least one first emoji, the at least one line of copy providing a text description of the respective menu or catalog item and displayed in at least a minimum font point size and characterized by at least a minimum color contrast ratio relative to a background of the particular button, the at least one first emoji indicating the respective menu or catalog item; and
    updating display of the GUI to indicate that the respective menu or catalog item for the particular button is added to the checkout cart;
    wherein the particular button having the border comprises a graphical element within the border, the graphical element, when selected, causing display of a sub-menu within the border, the sub-menu comprising a particular sub-button of one or more sub-buttons, the particular sub-button, when selected, modifying the respective menu or catalog item and causing display of an indication of the modifying the respective menu or catalog item within the border of the particular button.

2. The method of claim 1, wherein:
the particular button having the border comprises a second emoji within the border, the second emoji indicating a modification to the respective menu or catalog item.

3. The method of claim 1, wherein:
the particular button having the border comprises a second emoji within the border, the second emoji indicating an additional respective menu or catalog item.

4. The method of claim 1, wherein:
the plurality of concurrently displayed buttons is displayed in a grid of at least four rows and four columns, each row of the grid corresponding to a class of respective menu or catalog items.

5. The method of claim 1, wherein:
the plurality of concurrently displayed buttons is displayed in a grid of at least of four rows and of at least four columns, each row of the grid corresponding to a class of respective menu or catalog items.

6. The method of claim 1, wherein:
the particular button having the border is of a size that allows for no more than four lines of copy to be displayed within the border, the no more than four lines of copy being displayed in the minimum font point size.

7. The method of claim 1, wherein:
the minimum font point size is 18-point size and the minimum color contrast ratio relative to the background of the particular button is 3:1.

8. The method of claim 1, wherein:
the at least one line of copy and the at least one first emoji do not overlap in display within the border of the particular button.

9. The method of claim 1, further comprising:
inputting, via the GUI, a new text description of a new respective menu or catalog item;
automatically selecting, based on the new text description, at least one third emoji from a plurality of emojis, the plurality of emojis being stored in a database comprising one or more associations between the plurality of emojis and a plurality of respective menu or catalog items;
causing displaying, via the GUI, a new button, the new button, when selected, adding the new respective menu or catalog item to the checkout cart, the new button having a new border and displaying within the new border the new text description of the new respective menu or catalog item and the at least one third emoji, the new text description displayed in at least the minimum font point size and characterized by at least the minimum color contrast ratio relative to the background of the new button, the at least one third emoji indicating the new respective menu or catalog item.

10. A system comprising:
one or more processors;
a memory storing instructions which, when executed by the one or more processors, cause performance of:
receiving, via a graphical user interface (GUI), a user selection of a particular button of a plurality of concurrently displayed buttons, each button of the plurality of concurrently displayed buttons for adding a respective menu or catalog item to a checkout cart, the particular button having a border and displaying within the border at least one line of copy and at least one first emoji, the at least one line of copy providing a text description of the respective menu or catalog item and displayed in at least a minimum font point size and characterized by at least a minimum color contrast ratio relative to a background of the particular button, the at least one first emoji indicating the respective menu or catalog item; and
updating display of the GUI to indicate that the respective menu or catalog item for the particular button is added to the checkout cart;
wherein the particular button having the border comprises a graphical element within the border, the graphical element, when selected, causing display of a sub-menu within the border, the sub-menu comprising a particular sub-button of one or more sub-buttons, the particular sub-button, when selected, modifying the respective menu or catalog item and causing display of an indication of the modifying the menu or catalog item within the border of the particular button.

11. The system of claim 10, wherein:
the particular button having the border comprises a second emoji within the border, the second emoji indicating a modification to the respective menu or catalog item.

12. The system of claim 10, wherein:
the particular button having the border comprises a second emoji within the border, the second emoji indicating an additional respective menu or catalog item.

13. The system of claim 10, wherein:
the plurality of concurrently displayed buttons is displayed in a grid of at least four rows and four columns, each row of the grid corresponding to a class of respective menu or catalog items.

14. The system of claim 10, wherein:
the plurality of concurrently displayed buttons is displayed in a grid of at least of four rows and of at least four columns, each row of the grid corresponding to a class of respective menu or catalog items.

15. The system of claim 10, wherein:
the particular button having the border is of a size that allows for no more than four lines of copy to be displayed within the border, the no more than four lines of copy being displayed in the minimum font point size.

16. The system of claim 10, wherein:
the minimum font point size is 18-point size and the minimum color contrast ratio relative to the background of the particular button is 3:1.

17. The system of claim 10, wherein:
the at least one line of copy and the at least one first emoji do not overlap in display within the border of the particular button.

18. The system of claim 10, wherein the instructions, when executed by the one or more processors, further cause performance of:
inputting, via the GUI, a new text description of a new respective menu or catalog item;
automatically selecting, based on the new text description, at least one third emoji from a plurality of emojis, the plurality of emojis being stored in a database comprising one or more associations between the plurality of emojis and a plurality of respective menu or catalog items;
causing displaying, via the GUI, a new button, the new button, when selected, adding the new respective menu or catalog item to the checkout cart, the new button having a new border and displaying within the new border the new text description of the new respective menu or catalog item and the at least one third emoji, the new text description displayed in at least the minimum font point size and characterized by at least the minimum color contrast ratio relative to the background of the new button, the at least one third emoji indicating the new respective menu or catalog item.

\* \* \* \* \*